June 9, 1964
W. F. CARR
3,136,504
ELECTRICAL PRIMARY FLIGHT CONTROL SYSTEM
Filed July 2, 1963
2 Sheets-Sheet 1
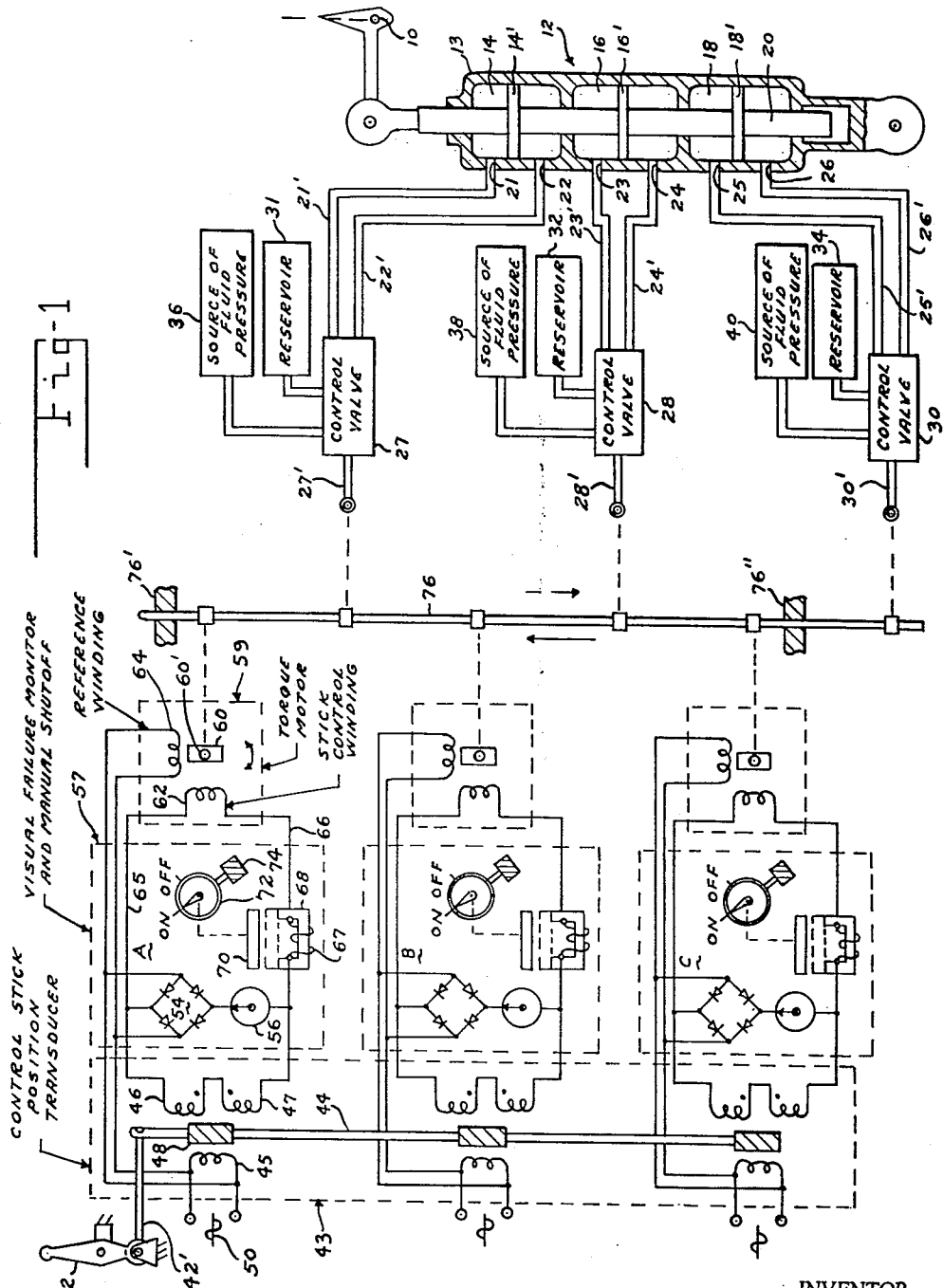
INVENTOR.
WILLIAM F. CARR
BY
ATTORNEY June 9, 1964  W. F. CARR  3,136,504
ELECTRICAL PRIMARY FLIGHT CONTROL SYSTEM
Filed July 2, 1963  2 Sheets-Sheet 2
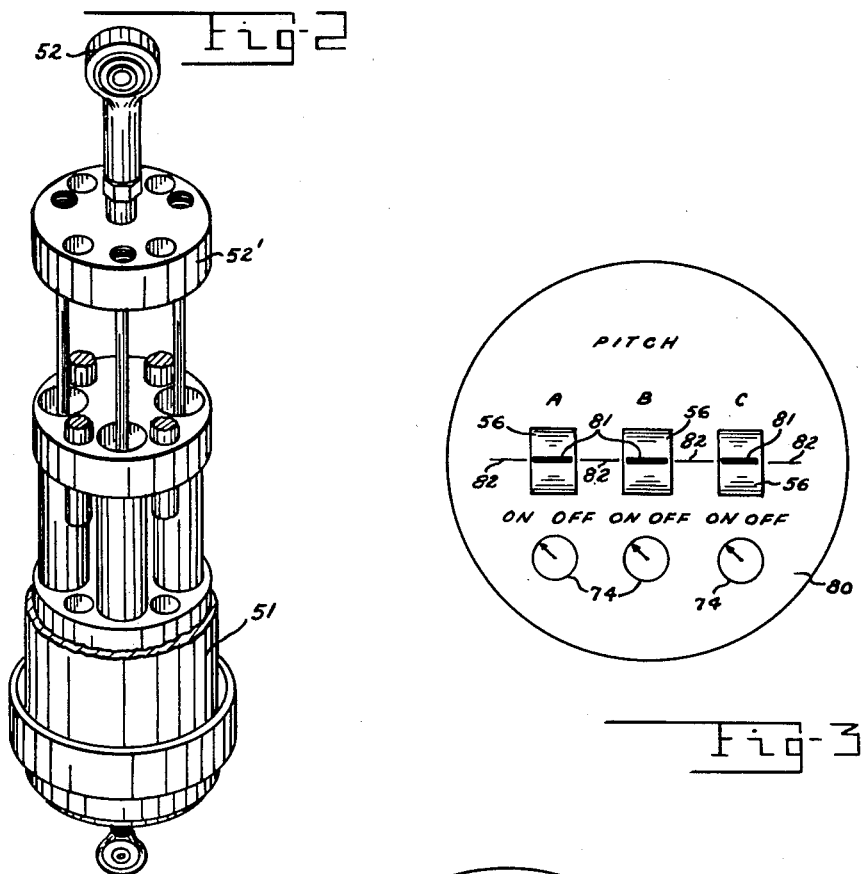
INVENTOR.
WILLIAM F. CARR
BY
ATTORNEY

United States Patent Office 3,136,504
Patented June 9, 1964

3,136,504
ELECTRICAL PRIMARY FLIGHT CONTROL SYSTEM
William F. Carr, Santa Monica, Calif., assignor to the United States of America as represented by the Secretary of the Air Force
Filed July 2, 1963, Ser. No. 292,506
3 Claims. (Cl. 244—78)

This invention relates to a flight control system for use with the type of aircraft in which displacement of a control column is converted into movement of a control surface by means of a servo-actuated hydraulic power cylinder responsive to the pilot's commands.

The higher performance required by military and other high speed aircraft has continuously provoked demands for greater precision and reliability in the development of primary flight control systems. Improvements in power assist equipment, reduction of mechanical linkages in the path between pilot and control surface, and efforts to eliminate friction and inertia of moving parts offer greater hope for improved standards in aircraft control. Numerous configurations in aircraft fabrication are suggested in which mechanical linkage paths are reduced the greatest possible extent in the search for greater compatibility between the pilot and the control system. The use of redundancy techniques has resulted where reliability is lost when a mechanical portion of a control system is replaced by one primarily electrical in character. Hence, when one control section of a redundant system fails completely or partially to fulfill its control function control over the flight attitude of the aircraft, though somewhat reduced in most cases, may still be possible by relying on the undisrupted channels.

One object of the invention is to provide a triply redundant primary flight control system permitting instant observation by the pilot of the failure of, or reduced sensitivity in, any of the several channels constituting a part of the redundant chain.

Another object of the invention is the provision of a triply redundant primary flight control system which furnishes sufficient power assistance to the aircraft control surfaces in the event one of the channels becomes disrupted.

A further object of the invention is to provide a triply redundant flight control system which allows the control signal in any of the channels to be gradually reduced to nearly zero.

In a system constructed in accordance with the invention, triplicate control channels adapted for parallel but independent operation are connected in an arrangement to produce electrical command signals representative of the displacement of the control stick of an aircraft. A triple unit electrical transducer converts the mechanical impulses of the stick into corresponding transducer signals having a magnitude and sign. A hydraulic power cylinder having direct control over the control surface is operated by three parallelly connected fluid pressure control valves. Each control valve depends for its operation on an alternating current torque motor each of which receives its energizing current from one of the transducer units. In the event of a faulty control channel, adequate power assistance for ensuring uninterrupted command of the flight attitude of the aircraft is provided by the undisrupted channels. An inductive switch is effectively connected in series with each transducer unit and its associated torque motor. Each switch controls the level of the current energizing the torque motor control winding so that, depending on whether the switch is "open" or "closed," the current fed to each torque motor may be reduced to a very low value or remain unaffected, respectively. A visual failure monitor equipped with shut-off devices under manual control of the pilot provides a visual means of detecting and gradually isolating a channel experiencing an electrical malfunction. Visual notice of a faulty channel is provided by a bank of indicators, one for each channel, each being mechanically associated with one of the inductive switches. An erratic channel or channels may be effectively deactivated by slowly operating the control knob of the switch associated with the faulty channel to its "closed" position. Abrupt changes in the flight attitude of the aircraft and any consequent "hardover" maneuvers may therefore be avoided.

Complete understanding of the invention and an introduction to other objects and features not specifically mentioned may be had from the following detailed description of a specific embodiment thereof when read in conjunction with the appended drawings, in which like reference characters refer to like elements in each of the several views, and wherein:

FIG. 1 shows a redundant primary flight control system embodying the invention;

FIG. 2 is a view in perspective showing a transducer adjustable for use in conjunction with the invention;

FIG. 3 shows a front elevational view of a visual failure monitor and shut-off device embodied in the invention; and FIG. 4 shows a second view of the failure monitor and shut-off device, somewhat abbreviated in presentation, and the indications in response to a maneuver of the control stick.

Referring now to FIG. 1, a control surface 10 is operated by a triple-acting hydraulic power unit 12 comprising a housing 13 enclosing cylindrical compartments 14, 16 and 18 accommodating, respectively, tandem pistons, 14′, 16′ and 18′ carried by a rod 20 coupled to the control surface. For reciprocating the pistons, housing 13 is provided with ports 21 through 26, inclusive, two for each compartment. Suitable fluid-pressure conducting lines 21′ to 26′, through which fluid pressure may be admitted to and exhausted from the respective compartments to establish the pressure and exhaust connections to the ends of the pistons, extend from the ports to suitable control valves 27, 28 and 30. Further fluid pressure connections to the control valves 27, 28 and 30 include those to reservoirs 31, 32 and 34 and sources of fluid pressure 36, 38 and 40, respectively. The fluid pressure sources preferably are established for operation independent of each other so that the failure of any single source of hydraulic power will not affect the operation of the remaining hydraulic power stages. Control valves 27, 28 and 30 are actuated by control levers 27′, 28′ and 30′, respectively. In a well known manner, each control lever, when moved in one direction from the neutral position shown, establishes internally of the control valve and in the respective compartment of unit 12 pressure and exhaust connections of one sense causing movement of the control surface in one direction. When moved in the opposite direction, pressure and exhaust connections of the opposite sense causing the control surface to move in the opposite direction are made.

Displacement of a pilot's control stick 42 is converted to electrical control signals distributed over parallel channels A, B and C, by means of a triply redundant transducer generally referenced 43. It will be noted that the elements associated with each channel are identical to those in the other channels. Accordingly, the circuit components associated with only one of the channels, namely channel A, will be fully referenced and described. Certain elements in the other two channels will also be referenced but, for the most part, the elements therein will be identified by comparison with the corresponding elements of channel A.

Considering now the arrangement of the transducer as shown, the transducer 43 comprises three identical and electrically independent units driven by a nonmagnetic shaft 44 coupled to a control stick extension 42'. Each transducer unit consists essentially of an annularly wound differential transformer having a primary winding 45, differentially wound secondary windings 46 and 47, and a movable core 48. In the form of construction illustrated, the cores of all the units are mounted on shaft 44 for synchronous displacement and, with respect to the secondary windings, are shown in the neutral positions. The primary winding 45 is adapted to be energized by a schematically indicated source of alternating current 50.

In keeping with the desired degree of redundancy, electrical power requirements to each transducer unit preferably are supplied by three separate generators. Thus, in an aircraft control system, each generator would supply power to one-third of the primary control channels.

Secondary windings 46 and 47 are wound in such a manner that magnetic flux generated by excitation of primary winding 45 will induce voltages of opposite polarity in the secondary windings. The amplitude and sign of the voltage of both secondary windings therefore are direct functions of the displacement of core 48 from the neutral position. The null voltage output of the windings is substantially zero with the core in the neutral position.

In an actual installation of the control system of the invention, the physical isolation of the transducer units may be improved in the manner shown in FIG. 2. There, a transducer according to a preferred embodiment of the invention comprises three movable shafts free to slide axially in a common housing 51. The shafts are mechanically connected to a central input shaft 52 adapted to be coupled, in turn, to an assembly of the control stick, such as the extension 42'. So that each transducer unit shall be capable of individual null position adjustment the point where each transducer unit shaft attaches to the flange 52' of shaft 52 may be made adjustable.

Alternating voltage developed across the secondary windings is rectified by a bridge rectifier 54 for application to a zero-center direct current meter 56 which may be of the character described in Lafayette Radio Electronics, Catalog No. 630, 1963, page 242. The meter 56, as reference to the named publication will show, essentially is identified as a tuning meter and comprises a movement capable of bi-directional operation by virtue of its connection with rectifier 54. The two remaining corners of the bridge receive an alternating voltage reference potential over lines fed by the same source exciting primary winding 45. With the control stick 42 in a position to establish the core 45 in its neutral position meter 56 yields a zero reading of no displacement. If the secondary windings 46 and 47 show a resultant voltage due to displacement of the pilot's stick the unbalance will be represented by a change of meter indication, according to the magnitude and direction of the unbalance.

The bridge rectifier and series-associated meter contribute to the formation of a failure monitor and manual shutoff means generally indicated 57, whose function is to detect signal currents which deviate from a prescribed normal range. Typical abnormalities are those arising from short circuits or serious disruptions in the connections causing a diminution, an increase, or even lack of signal occurrence. In short, the need for corrective action to eliminate the control function of a defective channel is indicated by means 57 each time a channel experiences a unique signal deemed detrimental to continued effective operation.

It will be seen that the monitor and shutoff means 57 is connected between, and effectively in series with, the transducer secondary windings and an alternating current torque motor 59 comprising a movable armature 60, a stick control winding 62, and a reference winding 64 energized by the same alternating voltage source 50 supplying primary winding 45. Stick control winding 62 has one end thereof coupled by means of line 65 to one end of secondary winding 46. The other end of stick control winding 62 is coupled to a corresponding end of winding 47, by means of a line 66 connecting with a winding 67 wound on a discontinuous magnetizable U-shaped core 68 of an inductive switch having an armature 70 movable between two extreme positions characterized by the full and dashed profiles of armature 70.

To what degree the meter 56 is permitted to follow the directional displacement of the control stick is determined by the position of armature 70 relative to the pole faces of core 68. Upon the occurrence of any erratic condition in the control channel A, as evidenced by an abnormal buildup or decrease in signal current, armature 70 may be moved in a direction which will cause the armature to close to a greater extent the magnetic circuit of core 68 and thereby increase the reactance of winding 57, so as to restrict significantly the magnitude of further current flow to control winding 62. In effect, the channel is eliminated due to the level of the reactance when the air gap is so closed.

Armature 70 is conveniently connected to a dual position switch 72 whose control knob 74 is placed within comfortable reach of the pilot, the switch being operable between two extreme positions such, as indicated, "On" and "Off." Switch 72 is preferably adapted to follow a ramp function over the range between the "On" and "Off" positions in such manner that the abrupt response so characteristic of step-function switches may be avoided. When the pilot determines that a control signal is in error and chooses to eliminate the defective channel from the control function the errant channel may be cut out slowly. Such action, of course, reduces the possibility of a violent maneuver in flight.

Torque motor 59 serves to convert the electrical control current produced through secondary winding unbalance into a proportional mechanical force. Angular revolution of armature 60 for a maximum command signal is a very small part of one revolution. As previously mentioned, the stick control winding 62 is excited by the secondary voltage to the associated transducer unit. This voltage varies from substantially zero at the neutral stick position to a maximum, accompanied by a polarity reversal, at the extreme attitude controlling stick positions. The constant reference current through winding 64 creates a flux which alternates in direction for each half-cycle pulsation. In practical usage, the flux passes through the ends of the armature in equal proportion, but no flux passes longitudinally of the armature and thus no force couple is created. The control winding 62 is excited by a variable control voltage of the same phase of the reference voltage. Flux due to current in winding 62 takes a path longitudinally through armature 60. Flux due to control current alone produces no rotational effect on the armature. However, net flux resulting from interaction of the reference and control current magnetic fields produces a traction force which acts as a couple to end to rotate the armature. Reversal of the magnetic field due to a reversal in the control current in winding 62 tends to cause armature 60 to rotate in the opposite direction. In the instant invention, the torque acting on armature 60 is proportional to the magnitude and direction of current in winding 62. The shaft 60' on which armature 60 is mounted is adapted to act as a torsion spring. This amounts to returning armature 60 to the neutral position when the current in winding 62 falls to zero.

The torque motors of channels A, B and C have their armatures mechanically connected to a bar 76 to which the control levers of valves 27, 28 and 30 are also connected. The three control levers therefore move as though a single unit. Bar 16 combines the torque of the individual motors and is provided with bearing surfaces 76' and 76" for limited reciprocable movement. Upward movement of the bar is effected if the summation of armature torques is greater in one angular direction than the other and vice versa. When the control winding currents are zero as they should be with the control stick neutralized bar 76 remains stationary. As displacement of the control stick occurs the angular movement of the torque motor armatures is the same. By simultaneous actuation of the pistons in hydraulic power unit 12, the pressure of which depends on the extent of control stick displacement, appropriate movement of control surface 10 is effected. By establishing a total hinge moment capability of 150 percent of that required for full operational stability of the aircraft, the torque due to movement of any of the armatures alone may be made sufficient to move bar 76 so as to operate the control valves. Obviously, the total hinge moment available for activating hydraulic power unit 12 is reduced roughly by one-third with each channel failure. In the event it is necessary to disable all three channels, the aircraft shall be controllable by manually actuated trim tabs in the control surface.

Reference is now made to FIG. 3 for a description of a visual failure monitor and manual shut-off device which is acceptable for use in conjunction with the electrical primary control system of the invention. Arranged in two banks on an instrument case 80 adapted for placement within convenient visual and physical range of the pilot are the zero-center meters 56 and the manual control knobs 74 of the switches 72, all of which represent the same units found in the individual channels of FIG. 1. The sense and magnitude of control current in the respective channels is indicated by a horizontal pointer 81 marked on the dial of each meter. Other lines 82 inscribed on the case 80 on both sides of each meter represent a reference plane. With each control knob in the "On" position and no unbalance in any of the transducer units the relations of the pointers 81 to the reference plane produces a substantially continuous horizontal stripe. Let it be assumed that movements about the pitch axis of an aircraft are simulated upon displacement of control stick 42. If the operation of each channel is proceeding in the desired manner the extent of angular displacement of the pointers from the reference plane will be the same. FIG. 4 is a display of meter agreement (showing only the meters for simplicity) which may be taken as occurring in response to a forward movement of the control stick. In the event one of the meter indicators fails to agree with the others it can be assumed that the errant reading stems from a faulty channel. A slight movement of the control stick will show which channel is not responding properly to the pilot's commands. If the difference in angular movement is great enough to be detected movement of the control knobs associated with the defective channel to the "Off" position will disconnect the faulty channel. In short, any contrast noted between the meter reading is corrected by deactivating the channel found to be inaccurate.

It will be understood that various changes and modifications in the arrangements of the parts which have been described and illustrated in order to explain the nature of the invention may be made by those skilled in the art within the spirit of the invention and the scope of the appended claims.

I claim:

1. A primary flight control system for aircraft comprising: a control surface; a triple-compartment hydraulic power cylinder having a piston in each compartment and a piston rod connecting said pistons to said control surface; a plurality of control valves each having a control lever and fluid pressure connections with one of said compartments for controlling fluid pressure admission to and exhaust from said cylinder; a reciprocally movable bar mechanically coupled to said control levers; said control levers upon being moved in one direction establishing in said valves a fluid-pressure path which acts to operate said control surface in one direction and when moved in the opposite direction similarly establishing a second fluid-pressure path which acts to operate said control surface in the opposite direction; three alternating current torque motors each including a control winding, a reference winding energized by a reference source of alternating current, and a rotatably mounted armature adapted for angular displacement from a reference position in accordance with the current in said control winding; means for mechanically coupling said armatures to said bar thereby imparting to said bar linear movement which operates said control levers upon turning of said armatures from said reference position; a pilot's control member; a plurality of electromechanical transducers mechanically coupled to said control member; each of said transducers having output terminals at which an electrical command signal having characteristics appropriate to the sense and magnitude of displacement of said control member is developed; the output terminals of each of said transducers being connected in series relation with one of said control windings; indicating means for visually presenting to the pilot the magnitude and directional characteristics of each comman signal; and a plurality of inductive switches each intercepting the electrical command signal transmitted to the respective control windings and having a movable member adapted by change from a first to a second position to leave unaffected or reduce substantially to zero the level of control command current fed to said control windings, respectively.

2. In a system as claimed in claim 1, said transducers each comprising a primary winding to which an alternating current is applied, an adjustable magnetic core for permitting variation in the coefficient of mutual coupling, a nonmagnetic shaft connecting said core with said control member, and two secondary windings wound differentially to produce no net voltage with said core centered magnetically with respect to said secondary windings but to produce a resultant voltage varying directly in polarity and magnitude with displacement of said core from its centered position.

3. In a system as claimed in claim 1, said indicating means comprising a bank of three zero-center direct current meters aligned horizontally on a panel within visual range of the pilot, each of said meters having a pointer which defines the center or null position of the scale in the absence of excitation, rectifying means for electrically connecting each of said meters to the output terminals of one of said transducers, horizontal reference marks inscribed on said panel in a plane coinciding with the null position indications of said pointers, the angular displacement of said pointers from the null position being the same except when the control command current in said control winding differs thereby alerting the pilot to an erratic channel.

References Cited in the file of this patent
UNITED STATES PATENTS
2,291,610    Crane _____ Aug. 4, 1942